Patented Aug. 30, 1932

1,874,547

UNITED STATES PATENT OFFICE

GEORG KRÄNZLEIN AND HEINRICH VOLLMANN, OF FRANKFORT-ON-THE-MAIN-HÖCHST, GERMANY, ASSIGNORS TO GENERAL ANILINE WORKS, INC., OF NEW YORK, N. Y., A CORPORATION OF DELAWARE

CYCLOKETONES, POLYCYCLOKETONES, AND QUINONES, AND PROCESS OF PREPARING THEM

No Drawing. Application filed July 6, 1928, Serial No. 290,874, and in Germany March 12, 1927.

Our present invention relates to cycloketones, polycycloketones and quinones and to a process of preparing them, more particularly to dyestuffs of the following constitution:

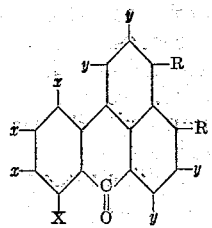

, wherein the two R's stand for the bivalent group.

, one X stands for halogen or alkyl, the other X's stand for hydrogen, halogen, alkyl or alkoxy and Y stands for hydrogen or halogen.

We have found that cycloketones can be obtained with good to nearly quantitative yields by heating, particularly by melting, with the aid of alkali-aluminium chloride in the presence of oxygen or oxygen-containing gases, for instance with air, a compound of the formula aryl-CO-aryl, wherein the aryl groups may also be substituted, for instance by an aroyl group, i. e. an aromatic mono- or polyketone which contains at least one free peri-position to the CO-group or CO-groups. By the addition of alkali chloride, preferably sodium chloride, there are obtained already at about 100° C. entirely thin-liquid homogeneous melts which can very efficiently be brought into contact with the oxygen present, for instance by stirring in an appropriate manner or the like.

In U. S. Patent specifications No. 1,564,584 and 1,582,475 there has been described the preparation of the 3.4.8.9-dibenzpyrenequinone-5.10— which is formed by the action of benzoyl chloride upon benzanthrone in the presence of aluminium chloride and advantageously while using oxygen. In the course of this process the Bz-1-benzoyl-benzanthrone is intermediately obtained.

By the present invention the 4.5.8.9-dibenzpyrenequinone-3.10 is obtained by condensing the isomeric 2-benzoylbenzanthrone with aluminium chloride or sodium aluminium chloride, advantageously likewise with the introduction of oxygen or air. The reaction takes the following course:

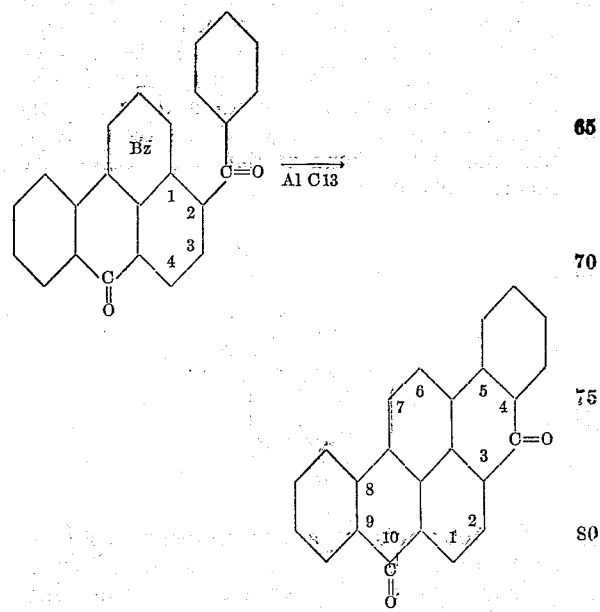

The product which is thus obtained in an excellent yield and purity dyes cotton from an orange-yellow vat intense yellowish-red tints. This is a surprising observation since 4.5.8.9-dibenzpyrenequinone-3.10 has presumably been prepared already by R. Scholl (cf. "Berichte der Deutschen Chemischen Gesellschaft" volume 55, page 122/123) from 1.4-dibenzoylnaphthalene with a yield, however, of only about 5 per cent and is stated by this author to show no affinity to the vegetable fiber.

The 2-aroylbenzanthrones used as starting materials in the process of our present invention have hitherto not been known. They can be prepared from the 2-benzanthrone-carboxylic acid of the melting point 307° C. (obtainable according to Example 2 of our co-pending U. S. patent application Ser. No. 218,573 filed September 9, 1927) by transforming it into its chloride and condensing the latter with a hydrocarbon or the like according to Friedel Craft's method.

We have furthermore found that by treating the said pyrenequinone derivatives with a halogen or a halogenating agent new dyestuffs are obtained which in part considerably differ from the non-halogenated products as regards the tints they yield. On the introduction of chlorine brighter tints, on brominating darker tints are obtained.

The following examples illustrate our invention, the parts being by weight:

(1) 10 parts of 2-benzoylbenzanthrone, which melts at 176° C. and forms, when recrystallized from xylene, yellow needles, are mixed, while stirring and introducing oxygen, with 150 parts of sodium-aluminium chloride for about 15 hours at 110° C. to 125° C. The melt which has at first a red appearance has then assumed an olive-green coloration. On pouring it into water, the dybenzpyrenequinone which has been formed is separated as red flakes which are filtered by suction and dried. The product which is obtained in an excellent yield and in a comparatively pure state crystallizes from nitrobenzene in the form of flat red needles. It has the formula:

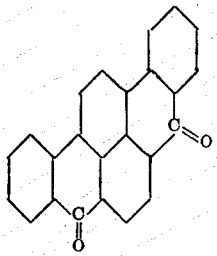

(2) 100 parts of para-bromobenzoyl-2-benzanthrone, which, when recrystallized from xylene, forms yellow felted needles melting at 245° C., are treated with 1200 parts of sodium-aluminium chloride while introducing oxygen as indicated in the preceding example. On working up the melt a light red crude product is obtained with a nearly quantitative yield. The monobromo-4.5.8.9-dibenzpyrenequinone-3.10, thus obtained, crystallizes from nitro-benzene in the form of flat red needles. It is soluble in concentrated sulfuric acid to a solution which is in a thick layer reddish-brown, in a thin layer pink; on gradually diluting this solution with water its color changes first to olive-green and finally the dyestuff is precipitated in the form of yellowish-red flakes. The vat of the dyestuff is reddish-orange, cotton is dyed in it a reddish-orange tint. When exposed to the air, the color of the dyeing changes by oxidation first to violet and then to red. The dyestuff has the following formula:

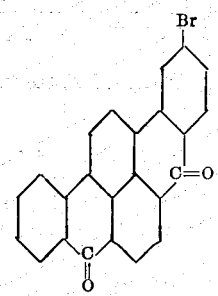

(3) 20 parts of 2-para-toluylbenzanthrone forming, when recrystallized from benzene or glacial acetic acid, yellow needles and melting at 173° C. are stirred at 115° C. to 120° C. for 22 hours with 250 parts of sodium-aluminium chloride, oxygen being introduced during this time. The melt yields, after the decomposition with dilute hydrochloric acid, red flakes. The methyldibenzpyrenequinone, thus obtained, crystallizes from nitrobenzene in the form of flat red needles. The yield of the pure product amounts to about 90 per cent of the theory. The color of its solution in concentrated sulfuric acid is in a thick layer reddish-brown, in a thin layer pink. The vat is orange with a red flower. The dyestuff dyes cotton bright red tints. It has the formula:

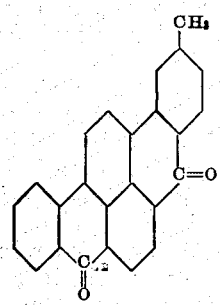

(4) By melting α-naphthoyl-2-benzanthrone (forming, when recrystallized from glacial acetic acid, yellow needles and melting at 222° C., soluble in concentrated sulfuric acid to a red solution) with sodium-aluminium chloride in the same manner as indicated in the preceding examples, the corresponding naphthobenzpyrenequinone is obtained which dyes cotton in an orange vat covered red (claret) tints with a pronounced blue hue having very good fastness properties. The dyestuff has the following formula:

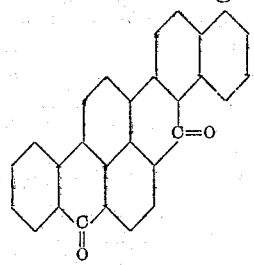

(5) 10 parts of 4.5.8.9-dibenzpyrenequinone-3.10 (prepared as indicated in Example 1) are dissolved in 180 parts of chloro sulfonic acid, to this solution is added a small quantity of iodine and chlorine is introduced therein, while cooling. The introduction of chlorine is stopped as soon as a test given into water yields reddish-orange flakes. The whole solution is then poured into water, while stirring, and the separated dyestuff is isolated by filtering with suction. The dyestuff, thus chlorinated, dyes cotton from a violet vat brilliant reddish-orange tints fast to chlorine and washing. It has the following formula:

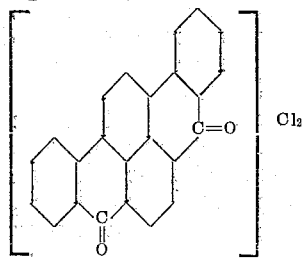

When continuing the introduction of chlorine for several hours, the dyestuff takes up more chlorine.

(6) 20 parts of bromine are added to a mixture prepared from 4.5.8.9-dibenzpyrenequinone in the manner indicated in the preceding example and the whole is stirred at 40° C. to 80° C. for 20 hours. The mass is then poured on water and the brominated dyestuff is isolated as usual in the form of bluish-red flakes. It dyes cotton from an orange vat vivid bluish-red tints, fast to chlorine and washing. It has the following formula:

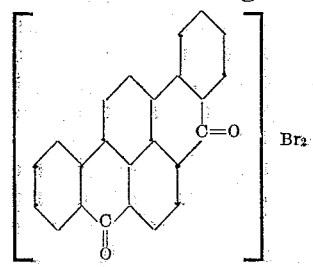

(7) 20 parts of 1-chloro-4-benzoylnaphthalene (obtainable from 1-chloronaphthalene with benzoyl chloride according to Friedel Craft, melting point 80° C.) are mixed with 200 parts of sodium-aluminium chloride and the mixture is stirred at about 120° C. for about 15 hours, while introducing oxygen. On decomposing the melt with water, olive flakes are obtained. On purification, for instance by sublimation in a vacuum, 10 to 12 parts of pure 2-chlorobenzanthrone are obtained melting at 300° C. The reaction probably takes the following course:

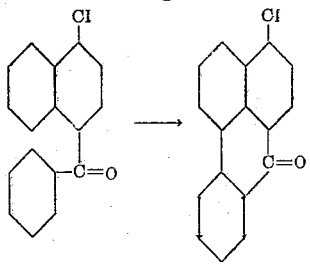

(8) 20 parts of 1-cyano-4-benzoylnaphthalene (obtainable by causing 1-chloro-4-benzoylnaphthalene to react with cuprous cyanide, almost colorless needles melting at 87° C.) are molten with 200 parts of sodium-aluminium chloride for 24 hours at 115° C. to 120° C., oxygen being introduced. The color of the melt which is at first yellow gradually turns during this operation to red. On decomposing the melt with water, the hitherto unknown 2-benzanthrone-nitrile is obtained in the form of light yellow flakes. By once recrystallizing the product from a mixture of xylene and nitrobenzene, about 15 parts of pure nitrile are obtained in the form of flat yellow needles melting at 234° C. The reaction probably takes the following course:

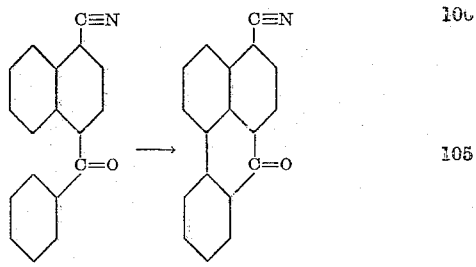

(9) 20 parts of 4-benzoyl-1-naphthoic acid (obtainable by saponifying the 1-cyano-4-benzoylnaphthalene referred to in Example 8, forming when recrystallized from alcohol colorless coarse prisms melting at 184° C.) are treated for 24 hours with sodium-aluminium chloride and oxygen in the manner indicated in Examples 7 and 8. On decomposing the melt, 2-benzanthronecarboxylic acid is obtained in the form of light yellow flakes. After recrystallization from nitrobenzene, it forms long yellow needles melting at 307° C. The yield of pure product amounts to over 70 per cent of the theory. The benzanthronecarboxylic acid, thus obtained, is identical with that obtainable according to Example 2 of our co-pending U. S. patent application Ser. No. 218,573 filed September 9, 1927.

(10) 50 parts of 1.4-dibenzoylnaphthalene are stirred together with 750 parts of sodium-aluminium chloride at 120° C. to 130° C., for 48 hours, while simultaneously introducing air. The reddish-brown flakes obtained by decomposing the reaction product with water are filtered by suction and washed and then treated with a hypochlorite solution, whereby the impurities which may be present and give the product a dark coloration, are destroyed and the pure condensation product remains, namely 4.5.8.9-dibenzpyrene-3.10-quinone. The yield amounts to over 60 per cent of the theory.

(11) 20 parts of 2-benzoylbenzanthrone (obtainable by condensing the benzanthrone-carboxylic acid described in Example 9 according to Friedel Crafts with benzene by way of its chloride) are molten with 200 parts of potassium-aluminium chloride at 125° C. for about 20 hours, while introducing oxygen. By decomposing the melt light red flakes are obtained in a quantitative yield. After recrystallization the yield of 4.5.8.9-dibenzpyrene-3.10-quinone amounts to about 90 per cent of the theory.

(12) 50 parts of 1.5-dibenzoylnaphthalene are treated with 750 parts of sodium-aluminium chloride for 48 to 60 hours in the manner indicated in Example 10. On decomposing the melt the 3.4.8.9-dibenzpyrene-5.10-quinone is obtained already in a very pure state as brownish-orange flakes. The product is completely purified by revatting it or treating it with hypochlorite, whereby it is obtained in a yield of over 70 per cent of the theory.

(13) By melting 100 parts of Bz-1-benzoylbenzanthrone with sodium-aluminium chloride, while introducing oxygen, at 120° C. for 24 hours, 100 parts of an orange-colored crude product are obtained, which after purification yields up to 90 per cent of pure 3.4.8.9-dibenzpyrene-5.10-quinone.

(14) 20 parts of Bz-1-α-naphthoylbenzanthrone are molten with 200 parts of sodium-aluminium chloride at 115° C. to 120° C. for 24 hours, while introducing oxygen. On revatting the crude product which is obtained by decomposing the melt, the pure condensation product is easily prepared in the form of orange flakes. The product dissolves in concentrated sulfuric acid to a green solution.

(15) 100 parts of 4-benzoylnaphthalic anhydride are molten with 1000 parts of sodium-aluminium chloride at about 190° C. for 10 hours with introduction of air. On decomposing the melt with water, a crude product is obtained in the form of yellow flakes which after recrystallization from nitrobenzene gives with a good yield golden-yellow needles of benzanthrone-peri-dicarboxylic anhydride melting at 350° C.

(16) A mixture of 40 parts of 1-4-dibenzoylnaphthalene and 400 parts of sodium-aluminium chloride is stirred at a temperature of between 125° C. and 145° C. for 30 to 50 hours, while introducing oxygen. The melt is worked up with water as usual, and by treating the crude dyestuff, thus obtained, with chlorine lye, it assumes a pure scarlet-red coloration. The dyestuff crystallizes from nitrobenzene in the form of flat red needles.

(17) By treating 1-4-di-(para-bromobenzoyl)-naphthalene in the manner indicated in the preceding example, a dyestuff is obtained which dyes cotton clear reddish-orange tints and which is, therefore, much more yellow than the dyestuff described in the foregoing example. It dissolves in concentrated sulfuric acid to a red solution.

(18) By melting 1-4-di-(chlorotoluyl)-naphthalene (obtainable by condensing 1-4-naphthalenedicarboxylic acid chloride with ortho-chlorotoluene, melting point 140° C.) with a mixture of aluminium chloride and potassium chloride at 130° C. to 140° C., while introducing air, there is obtained the correspondingly substituted 4.5.8.9-dibenzpyrenequinone-3.10, which after purification gives on cotton from a reddish-orange vat clear scarlet-red tints. The color of the solution of this dyestuff in concentrated sulfuric acid is in a thin layer carmine red, in a thick layer reddish-brown.

(19) 10 parts of 1-4-di-(para-chlorobenzoyl)-naphthalene are introduced into 90 parts of molten sodium-aluminium chloride and the melt is stirred for 50 hours, while introducing oxygen. The melt is worked up in the manner indicated in Examples 16, 17 and 18. The dichloro-4.5.8.9-dibenzpyrene-quinone-3.10, thus obtained, crystallizes from nitrobenzene in the form of thin reddish-orange needles. This product dyes cotton from an orange-red vat clear reddish-orange tints.

(20) 10 parts of 1.5-ditoluylnaphthalene (obtainable by condensing naphthalene-1.5-dicarboxylic acid chloride with toluene melting point 188° C. to 189° C.) are molten with 100 parts of sodium-aluminium chloride at 130° C. for 40 to 50 hours, while introducing gaseous oxygen. Thus a dimethyl-3.4.8.9-dibenzpyrene-5.10-quinone is obtained. The dyestuff is worked up as usual and dyes cotton from a red vat fast orange tints. It dissolves in concentrated sulfuric acid to a reddish-blue solution.

(21) 10 parts of 1.5-di-(bromobenzoyl)-naphthalene (obtainable from naphthalene-1.5-dicarboxylic acid chloride by condensing it with bromobenzene, melting at 210° C. to 211° C.) are molten with 100 parts of potassium-aluminium chloride and 10 parts of sodium nitrite at 140° C. to 150° C. for 100 hours, while introducing oxygen. The dibromo-3.4.8.9-dibenzpyrene-5.10-quinone dyes cotton from a violet vat golden-orange tints.

It dissolves in concentrated sulfuric acid to a blue solution.

(22) 50 parts of 1.5-di-(chlorotoluyl)-naphthalene (obtainable from naphthalene-1.5-dicarboxylic acid chloride and ortho-chloro-toluene, melting at 189° C. to 190° C.) are molten with 500 parts of sodium-aluminium chloride with the addition of 10 per cent of copper chloride at 140° C. for 40 hours, while introducing oxygen. A dimethyl-dichloro-3.4.8.9-dibenzpyrene-5.10-quinone is obtained dyeing cotton from a violet vat a golden-orange tint. The color of its solution in concentrated sulfuric acid is reddish-blue.

Instead of oxygen or an oxygen-containing gas there may be added to the alkali-aluminium chloride melt in the preceding examples another oxidizing agent, as for instance pyrolusite, sodium nitrite, copper chloride, or lead dioxide. The said solid oxidizing agents may also be added to the melt together with geasous oxygen.

The processes in accordance with the preceding examples, particularly those using molecular oxygen as oxidizing agent, may also advantageously be carried out with application of pressure.

This application contains subject matter in common with our application Ser. No. 259,598 filed March 6, 1928.

We claim:

1. The process which consists in treating in the heat an aromatic ketone of the formula:

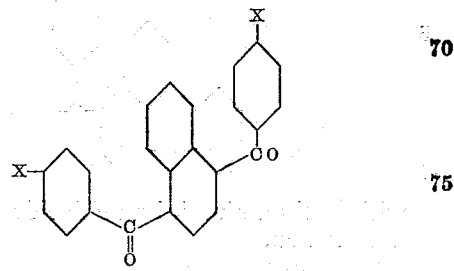

wherein X stands for hydrogen, halogen or alkyl with aluminium chloride and an oxidizing agent, in the presence of an alkali metal chloride.

2. The process which consists in melting at a temperature between 110° C. and 180° C. an aromatic ketone of the formula:

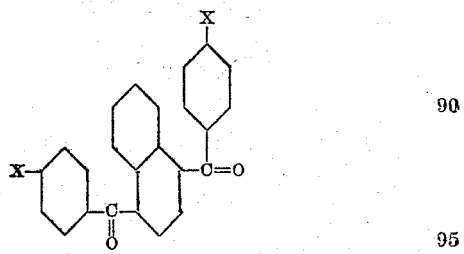

wherein X stands for hydrogen, halogen or alkyl with an alkali-aluminium chloride and molecular oxygen.

3. The process which consists in treating in the heat an aromatic ketone of the formula:

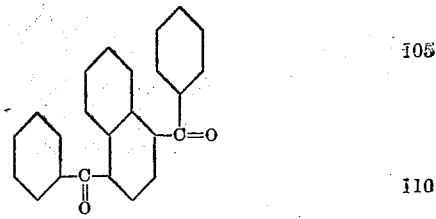

wherein X stands for hydrogen, halogen or alkyl with aluminium chloride and an oxidizing agent, in the presence of an alkali metal chloride.

4. The process which consists in melting at a temperature between 110° C. and 180° C. an aromatic ketone of the formula:

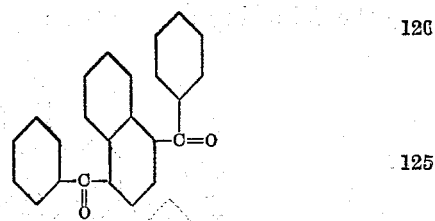

wherein X stands for hydrogen, halogen or alkyl with an alkali-aluminium chloride and molecular oxygen.

5. The process which consists in treating in the heat the aromatic ketone of the formula:

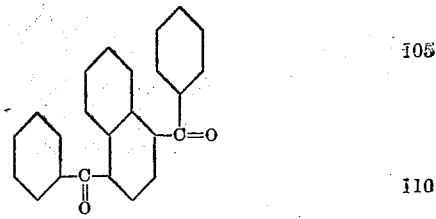

with aluminium chloride and an oxidizing agent, in the presence of an alkali metal chloride.

6. The process which consists in melting at a temperature between 110° C. and 180° C. the aromatic ketone of the formula:

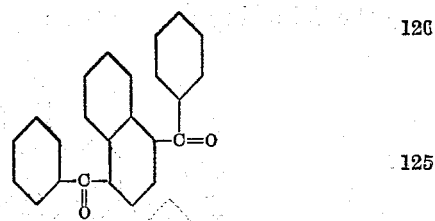

with an alkali-aluminium chloride and molecular oxygen.

7. The process which consists in melting at a temperature between 120° C. and 160° C. the aromatic ketone of the formula:

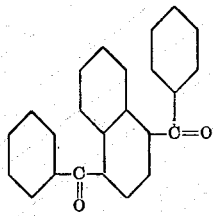

with sodium-aluminium chloride and molecula oxygen.

8. As new products, the compounds of the following constitution:

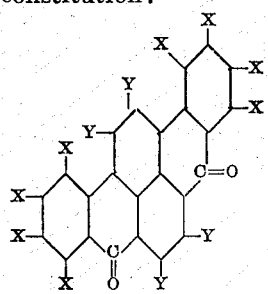

wherein one X stands for halogen or alkyl, the other X's stand for hydrogen, halogen, alkyl or alkoxyl and Y stands for hydrogen or halogen, said products being yellow to orange to red flakes or needles and dyeing the vegetable fiber yellow to orange to red tints.

9. As new products, the compounds of the following constitution:

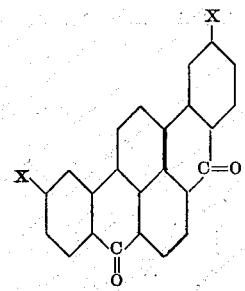

wherein X stands for a halogen or an alkyl group, both X's being of the same kind, said products being yellow to orange to red bodies, crystallizing from high-boiling solvents in the form of needles and dyeing the vegetable fiber in the vat yellow to orange to red tints.

10. As new products, the compounds of the following constitution:

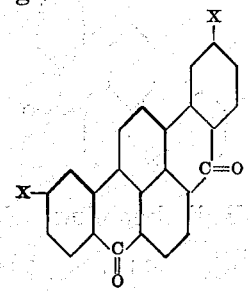

wherein X stands for a halogen, both X's being of the same kind, said products being yellow, orange to red bodies, crystallizing from high-boiling solvents in the form of needles and dyeing the vegetable fiber in the vat yellow, orange to red tints.

11. As a new product, the compound of the following constitution:

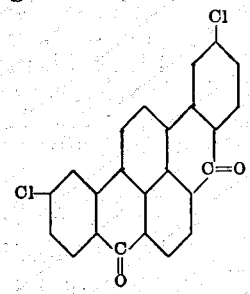

being a reddish-orange body, crystallizing from high-boiling solvents in the form of needles and dyeing the vegetable fiber reddish-orange tints.

12. As a new product, the compound of the following formula:

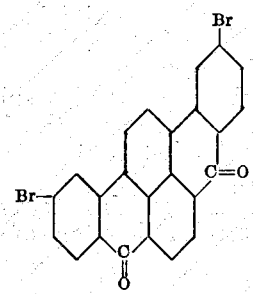

being a reddish orange body dissolving in concentrated sulfuric acid to a red solution and dyeing vegetable fiber clear reddish-orange tints.

13. As a new product, the compound of the following formula:

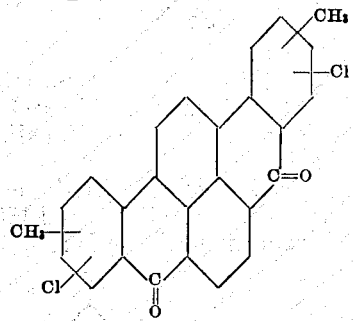

wherein Cl and $Ch_3$ stand in ortho position to each other, being a reddish-orange body dissolving in concentrated sulfuric acid to a red solution and dyeing vegetable fiber clear scarlet-red tints.

In testimony whereof, we affix our signatures.

GEORG KRÄNZLEIN.
HEINRICH VOLLMANN.